United States Patent
Kapanowski

[11] Patent Number: 6,073,733
[45] Date of Patent: Jun. 13, 2000

[54] DISC BRAKE APPARATUS

[75] Inventor: Martin Christopher Kapanowski, Plymouth, Mich.

[73] Assignee: Ford Motor Company, Dearborn, Mich.

[21] Appl. No.: 08/902,735

[22] Filed: Jul. 30, 1997

[51] Int. Cl.[7] .................................................. F16D 55/18
[52] U.S. Cl. .......................................................... 188/72.4
[58] Field of Search ................................. 188/72.3, 72.4, 188/73.31, 72.5

[56] References Cited

U.S. PATENT DOCUMENTS

| | | | |
|---|---|---|---|
| 3,377,076 | 4/1968 | Burnett | 277/582 |
| 3,828,894 | 8/1974 | Crossman | 188/71.8 |
| 4,156,532 | 5/1979 | Kawaguchi et al. | 277/587 |
| 4,799,575 | 1/1989 | Kroniger. | |
| 4,867,280 | 9/1989 | Von Gruenberg et al. | |
| 4,875,556 | 10/1989 | Shaw et al. | |
| 5,072,811 | 12/1991 | Everhard | 188/72.4 |
| 5,167,303 | 12/1992 | Kobayashi et al. | |
| 5,172,793 | 12/1992 | Temple et al. | 188/72.4 |
| 5,845,747 | 12/1998 | Rike et al. | 188/72.4 |

*Primary Examiner*—Robert J. Oberleitner
*Assistant Examiner*—Melanie Talavera
*Attorney, Agent, or Firm*—Gregory P. Brown

[57] ABSTRACT

A disc brake apparatus for use in a hydraulic brake system including a master cylinder for generating a hydraulic signal which is communicated through a hydraulic line and proportional to an actuation force applied to inner and outer brake pads for resisting rotation of a brake rotor of the type found on motor vehicles. The disc brake apparatus includes an outboard cylinder member (92) having a bore (94) and a first shoulder (100) therein. An outboard piston (98) is slidably housed within the bore of the outboard cylinder member. The outboard piston (98) includes a first end (126) adapted to force the outer pad (48) toward the brake rotor in response to the hydraulic signal applied to a second end (128) of the outboard piston (98). The outboard piston (98) also includes a second shoulder (132) for engagement with the first shoulder (100) to retain the outboard piston (98) in an applied position. An outboard seal (140) is disposed within the bore of the outboard cylinder member, the seal being sufficiently compressed by the outboard piston in the applied position so as to return the outboard piston to a resting position upon release of the hydraulic signal.

16 Claims, 2 Drawing Sheets

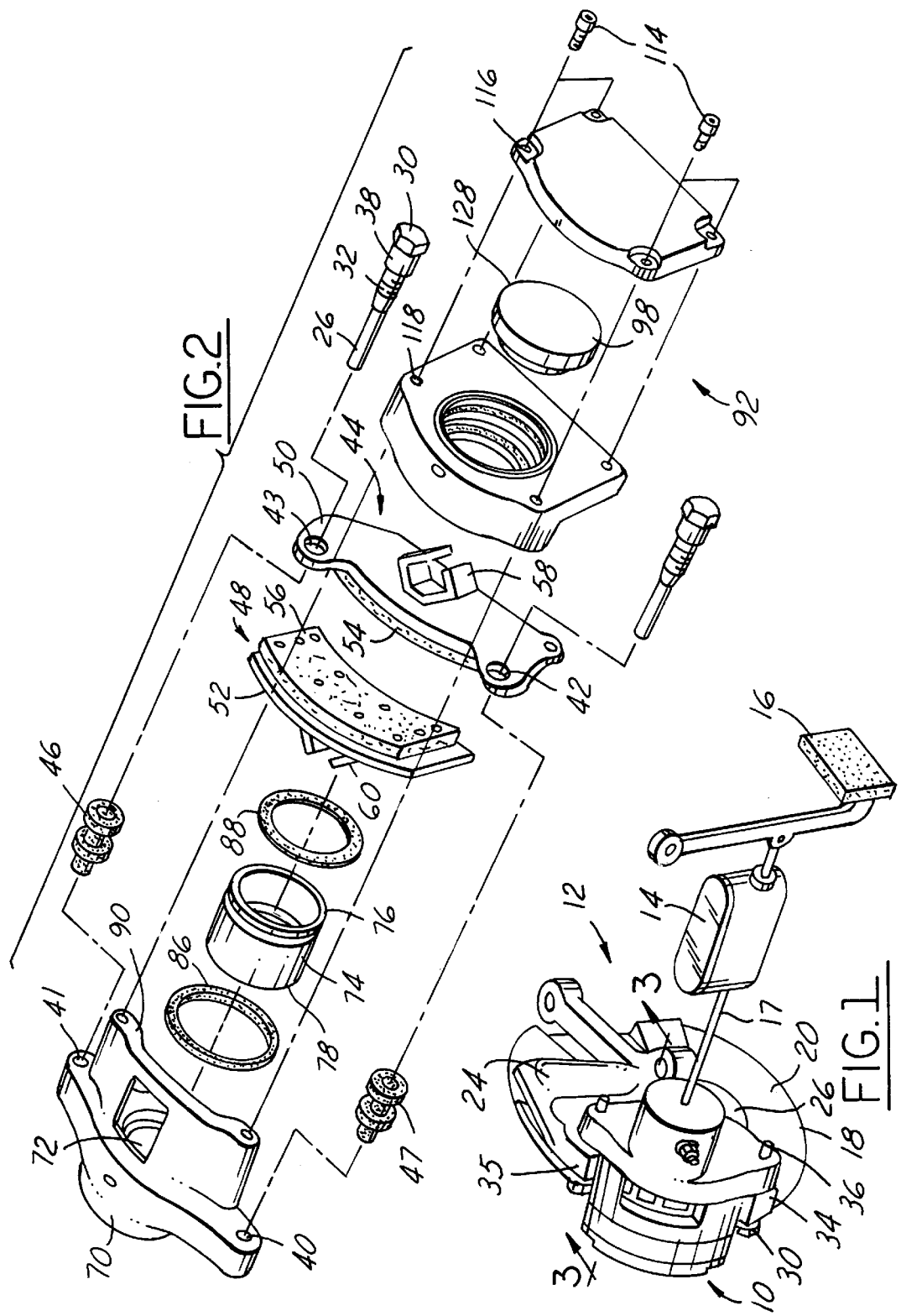

DISC BRAKE APPARATUS

BACKGROUND OF THE INVENTION

1. Field of the Invention

The invention relates generally to hydraulic brake system as used in motor vehicles. More particularly, the present invention relates to a slidable caliper having opposed inboard and outboard hydraulically actuated pistons for forcing a pair of inner and outer brake pads into frictional engagement with a rotatable brake disc.

2. Disclosure Information

Floating or sliding disc brake calipers are well known in the art. A master cylinder generates a hydraulic signal which is communicated to several brake actuators via brake lines. The signal drives a piston disposed within the sliding caliper, which in turn forces an inboard brake pad into frictional engagement with a rotatable brake disc. A reaction force is generated which causes the floating caliper to slide inboard, drawing an outboard brake pad into frictional engagement with the rotatable brake disc. Upon release of the brake signal, the brake pads must retract from the brake disc to prevent frictional driving losses, as well as undue wear on the braking components.

Known floating calipers utilize an elastomeric seal to forcibly retract the piston, which works in combination with general vibration to drive the inboard pad away from the brake disc. The floating caliper must slide away from brake disc to draw the outboard pad away from the brake disc. This is generally accomplished with some form of elastomeric device on the caliper mounting screws, together with vibrations of the assembly. It has been observed that in field use, the retraction efficiency of known floating calipers degrades with time, especially with respect to the outboard pad. Much effort has been directed at improving the sliding of the caliper, but these are generally costly, complex and less than completely satisfactory.

Another solution has been to provide two opposed, hydraulically actuated pistons within the caliper, the second piston being a mirrored copy of the inboard piston assembly located on the outboard side of the brake disc. This has proven to be particular effective at retracting the brake pads, however, due to the increased size of the caliper, it can only be packaged on vehicles having very large wheels. Therefore, this solution has been restricted to a very small percentage of the vehicles on the road having unusually large wheel and tire assemblies.

It would therefore be desirable to provide a disc brake apparatus capable of positively retracting the brake pads for use in vehicles having restricted space for packaging a brake caliper.

SUMMARY OF THE INVENTION

Accordingly, the present invention provides a disc brake apparatus providing positive inboard and outboard brake pad retraction in a brake caliper that is package efficient. A disc brake apparatus for use in a hydraulic brake system having a master cylinder for generating a hydraulic signal that is communicated through a hydraulic line and is proportional to an actuation force applied to inner and outer brake pads for resisting rotation of a brake rotor of the type found on motor vehicles has been discovered.

The disc brake apparatus includes an inboard cylinder member including a bore with an inboard piston slidably housed therein. The piston has a first end adapted to force the inner brake pad onto the brake rotor in response to the hydraulic signal applied to a second end of the inboard piston. An inboard seal is located between the inboard piston and the bore of the inboard cylinder member providing a sealed sliding relationship between the bore and the piston.

The disc brake apparatus further includes an outboard cylinder member having a bore and a first shoulder therein with a bridge member spanning the brake rotor and the inner and outer pads and interconnecting the inboard and outboard cylinder members. An outboard piston is slidably housed within the bore of the outboard cylinder member.

The outboard piston includes a first end adapted to force the outer pad toward the brake rotor in response to the hydraulic signal applied to a second end of the outboard piston. The piston also includes a second shoulder extending radially outward from an outer surface of the outboard piston for engagement with the first shoulder of the outboard cylinder member to retain the outboard piston in an applied position. An outboard seal is disposed within the bore of the outboard cylinder member, the seal being sufficiently compressed by the outboard piston in the applied position so as to return the outboard piston to a resting position upon release of the hydraulic signal.

Advantageously, the outboard piston and bore can be very short, since the piston effectively only needs to stroke enough to compress the outboard seal to provide the positive return. The sliding caliper provides the addtional travel required to engage the outer pad with the brake disc. This permits the caliper to be packaged in a space only marginally larger than a conventional single piston caliper.

BRIEF DESCRIPTION OF THE DRAWINGS

FIG. 1 is a perspective view of a disc brake apparatus constructed in accordance with the present invention.

FIG. 2 is an exploded view of a disc brake apparatus constructed in accordance with the present invention.

DETAILED DESCRIPTION OF THE PREFERRED EMBODIMENT

Figure 3:
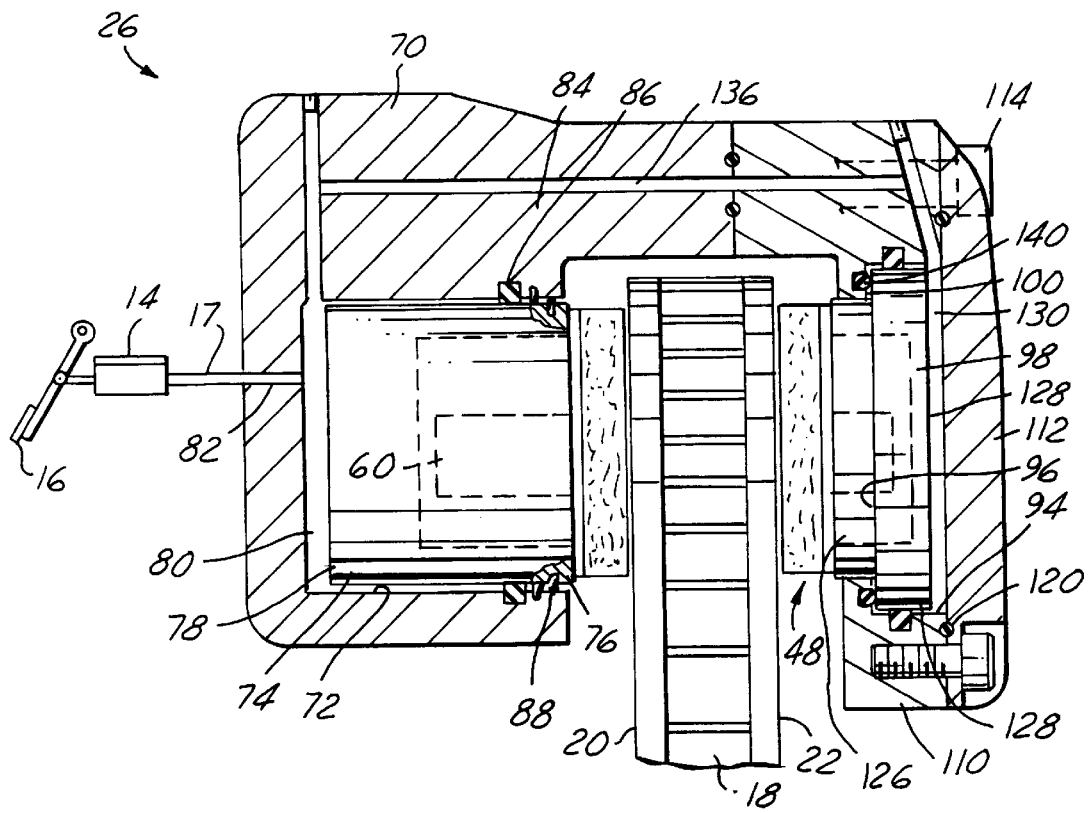
FIG. 3 is a sectional view taken along line 3-3 from FIG. 1 of a disc brake apparatus constructed in accordance with the present invention.

Referring now to FIGS. 1 and 2, a disc brake assembly 10 for use in a hydraulic brake system 12 as found in motor vehicles is illustrated. The hydraulic brake system includes a master cylinder 14 for generating a hydraulic signal in response to a vehicle operator applying a brake effort to a brake pedal 16. The hydraulic signal is communicated in a conventional manner through a hydraulic line 17 to a plurality of brake actuators, generally located at each wheel of the vehicle, where an actuation force is created proportional to the hydraulic signal in accordance with the size of the actuator. It will be recognized by those skilled in the art reading this disclosure that the present invention is described with reference to a simple brake system, but may also be used with equivalent advantages in advanced brake systems employing anti-lock, traction assist and other forms of advanced brake control for supplementing overall vehicle control.

The disc brake assembly further includes a brake disc 18 having inner and outer braking surfaces 20, 22. The brake disc 18 is secured to the wheel hub (not shown) so that the brake disc rotates with the wheel and tire assembly (also not shown). The wheel hub is disposed within a carrier 24 attached through the suspension members to the body or frame of the motor vehicle. A floating style caliper 26 is slidably secured to the carrier 24 by two threaded fasteners 30 having threaded portions 32 thereon for engaging threaded mounting tabs 34, 35 on the carrier 24. The threaded fasteners 30 further include inboard and outboard guide portions 36, 38 which pass through inboard guide apertures 40, 41 disposed on the caliper and outboard guide apertures 42, 43 disposed on an outer brake pad 44, respectively. The guide portions allow the caliper 26 to slide axially inboard and outboard thereon. Elastomeric compression members 46, 47 may be disposed on the inboard guide portion 36 between the inboard guide apertures 40, 41 and the mounting tabs 34, 35 of the caliper to further aid movement of the caliper 26. It should be recognized by those skilled in the art that many different floating or sliding caliper designs are commonly known and would perform equivalently with respect to the present invention.

The outer brake pad 44 and an opposed inner brake ad 48 include backing plates 50, 52 slidable relative to the carrier 24 and having friction blocks 54, 56 bonded, riveted or otherwise secured thereto for frictional engagement with outer and inner braking surfaces 22, 20 of the brake disc 18. The outer and inner brake pads 44, 48 each also include retaining clips 58, 60 secured to the backing plates on a side opposite from the friction blocks.

Referring now to FIGS. 2 and 3, the caliper includes an inboard cylinder member 70 having a blind bore 72 therein for slidably housing an inboard piston 74. The inboard piston 74 includes an open first end 76 for receiving the retaining clip 60 of the inner brake pad 48 and a closed second end 78 for forming a sealed inboard fluid chamber 80 within the blind bore 72. The hydraulic signal is communicated from the hydraulic line 17 into the fluid chamber 80 by an inlet conduit 82.

The bore 72 of the inboard cylinder member 70 includes a circumferentially disposed, radially extending groove 84 for retaining an inboard seal 86 to permit a sealed, sliding relationship between the bore 72 and the inboard piston 74. In the preferred embodiment, the inboard seal 86 consists of a rollback seal having a polygonal cross-section, commonly taking the form of a square or rectangle, however many other shapes function equivalently. The inboard cylinder member 70 may also include a flexible dust boot 88 sealingly interconnecting the first end 76 of inboard piston 74 to the open end of the blind bore 72 to prevent debris from entering the space between the bore and the piston.

The caliper also includes a bridge member 90 spanning the brake disc and the inner and outer pads to interconnect the inboard cylinder member 70 with an outboard cylinder member 92. The bridge member 90 may be a separate component or it may be integrally cast with the inboard cylinder member 70 or the outboard cylinder member 92, or partially cast as a part of both.

Figure 4:
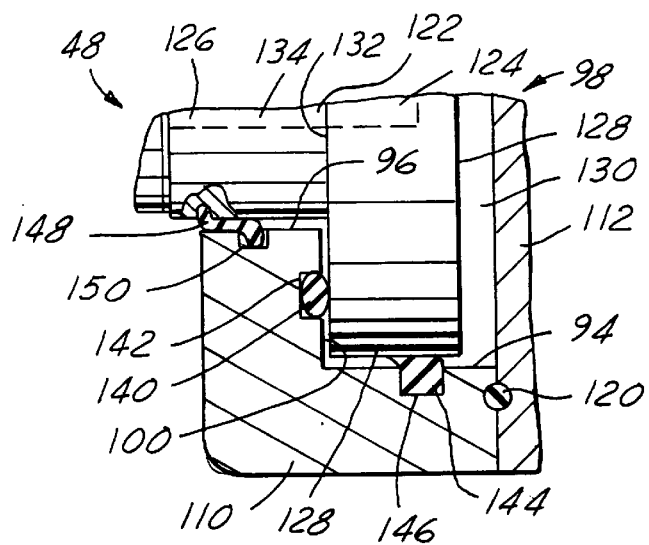
FIG. 4 is an enlarged partial view taken from FIG. 3 of a disc brake apparatus constructed in accordance with the present invention.

Referring now to FIGS. 3 and 4, the outboard cylinder member 92 includes first and second bore portions 94, 96 axially aligned for slidably housing an outboard piston 98. The first and second bore portions 94, 96 are divided by a radially extending first shoulder 100 spaced a predetermined distance therebetween to prevent binding of the outboard piston 98 within the first and second bore portions. The second bore portion 96 is located adjacent to the outer pad 44 and is characterized by having a smaller diameter than that of the first bore portion 94.

In the presently preferred embodiment, the outboard cylinder member 92 consists of a bore member 110 housing the first and second bore portions 94, 96 and the first shoulder 100 as well as a cover 112 sealingly secured to the bore member 110. Attachment of the cover 112 to the bore member 110 is provided by a plurality of threaded fasteners 114 passing through a plurality of fastener apertures 116 in the cover and axially aligned with a plurality of threaded fastener apertures 118 in the bore member 110. The seal created between the cover 112 and the bore member 110 may be enhanced with the use of a cover seal 120 disposed between the cover 112 and the bore member 110.

The outboard piston 98 includes axially aligned first and second piston portions 122, 124, with the first piston portion 122 disposed within the second bore portion 96 with an open first end 126 for receiving the retaining clip 58 of the outer brake pad 44. The second piston portion 124 is slidably sealed within the first bore portion 94 and includes a closed second end 128 for forming a sealed outboard fluid chamber 130 within the outboard cylinder member 92. The second end 78 of the inner piston 74 has a smaller diameter than that of the second end 128 of the outer piston 98. The outboard piston 98 also includes a second shoulder 132 positioned between the first and second piston portions 122, 124 and extending outward from an outer surface 134 of the first piston portion 122 for engagement with the first shoulder 100 of the bore member 110 when the outboard piston 98 is forced into an applied position by the hydraulic signal.

A fluid channel 136 passing internally through the bridge member 90 communicates the hydraulic signal from the inboard fluid chamber 80 to the outboard fluid chamber 130. Alternatively, an external hydraulic tube (not shown) could be used in place of the internal fluid channel for communicating the hydraulic signal directly to the outboard fluid chamber 130. The outboard cylinder member 92 also includes an outboard bleeder 138 fluidly connected to the outboard fluid chamber 130 for removing air therefrom.

The caliper 10 also includes an outboard seal 140 disposed within the bore member 110 of the outboard cylinder member 92. In the presently preferred embodiment, an outboard seal groove 142 formed on the first shoulder 100 of the bore member 110 retains the outboard seal 140 for engagement with the second shoulder 132 of the outboard piston 98. Additionally, the caliper 10 also includes a ring seal 144 retained by a ring groove 146 formed in the first bore portion 94 for hydraulically sealing the outboard fluid chamber 130. If desired, the ring seal 144 can be formed with a polygonal cross-section similar to that of the inboard seal 86 to create a rollback type seal. A dust seal 148 seated in a dust seal groove 150 formed at the opening of the second bore portion 96 of the bore member 110 prevents passage of external contaminants into the bore of the outboard cylinder member.

The operation of the present invention will now be described with reference to FIGS. 3 and 4. Upon application of a brake effort to the brake pedal 16 by the vehicle operator, the master cylinder 14 generates a hydraulic signal which is communicated to the caliper 10 via the hydraulic line 17. The hydraulic signal is communicated to the inboard and outboard fluid chambers 80, 130 via channel 136. The hydraulic signal, operatively hydraulic pressure, creates a force when applied to the surface area of the second ends of the inboard and outboard pistons. This force is transmitted to the inner and outer brake pads, thus causing them to slide toward the brake disc. The inboard piston and inner brake pad travel out of the inboard cylinder member until the inner pad contacts the inner braking surface of the brake disc. As the inboard piston travels outward, the inboard seal, if of the rollback design, is rolled outward.

Similarly, the outboard piston and outer brake pad travel out of the outboard cylinder member until the second shoulder 132 fully compresses the outboard seal 140 and contacts the first shoulder 100. Additionally, if the ring seal 144 is of the rollback design, the outward travel of the outboard piston rolls the ring seal. Once the outboard piston is in the applied position (as shown in FIG. 4), the slidable caliper will slide until the outer pad comes into contact with the outer braking surface of the brake disc. The larger diameter of the second piston portion 124 assures that the outboard piston will remain in the applied position for any substantial hydraulic signal, as a higher force will be generated by that piston than is generated by the inboard piston 74.

As the brake effort is removed, the hydraulic signal and hence, the hydraulic pressure diminishes. The inboard seal 86, if of the rollback design, draws the inboard piston back into the bore of the inboard cylinder member. Similarly, the compressed outboard seal 140 and the ring seal 144, if of the rollback design, positively draw the outboard piston and outer brake pad away from the outer braking surface and into a resting position (as shown in FIG. 3).

The foregoing description presents a preferred embodiment of the present invention. Details of construction have been shown and described for purposes of illustration rather than limitation. For instance, it might occur to one skilled in the art to cast the inboard cylinder member 70, bridge member 90 and the outboard cylinder member 92 as a single component, with the cover 112 merely providing access to machine the first and second bore portions 94,96. Modifications and alterations of the invention such as this will no doubt occur to those skilled in the art that will come within the scope and spirit of the following claims.

I claim:

1. A disc brake apparatus for use in a hydraulic brake system having a master cylinder for generating a hydraulic signal which is communicated through a hydraulic line and proportional to an actuation force applied to inner and outer pads for resisting rotation of a brake rotor of the type found on motor vehicles, said disc brake apparatus comprising:

an inboard cylinder member including a bore;

an inboard piston slidably housed within said bore of said inboard cylinder member, said piston having a first end adapted to force the inner pad onto the brake rotor in response to the hydraulic signal applied to a second end of said in board piston;

an inboard seal disposed between said inboard piston and said bore of said inboard cylinder member;

an outboard cylinder member having a bore and a first shoulder therein;

said bore of said outboard cylinder member having first and second bore portions axially aligned and having said first shoulder therebetween, said second bore portion being adjacent to the outer pad and having a smaller diameter than said first bore portion;

a bridge member spanning the brake rotor and the inner and outer pads and interconnecting said inboard and outboard cylinder members;

an outboard piston slidably housed within said bore of said outboard cylinder member and having a first end adapted to force the outer pad toward said brake rotor in response to the hydraulic signal applied to a second end of said outboard piston;

a second shoulder extending radially outward from an outer surface of said outboard piston for engagement with said first shoulder of said outboard cylinder member to retain said outboard piston in an applied position; and an outboard seal disposed within said bore of said outboard cylinder member, said seal being sufficiently compressed by said outboard piston in said applied position so as to return said outboard piston to a resting position upon release of said hydraulic signal;

wherein said outboard piston further comprises first and second piston portions axially aligned with said second shoulder disposed therebetween, said first piston portion being in a sealed relationship within said first bore portion and said second piston portion being in a sealed relationship with said second bore portion.

2. A disc brake apparatus according to claim 1, wherein said inboard seal comprises a rollback seal disposed within a groove cut in said bore of said inner cylinder member, said rollback seal having a polygonal cross-section.

3. A disc brake apparatus according to claim 1, further comprising:

an outboard seal groove disposed on said first shoulder for retaining said outboard seal for engagement with said second shoulder;

a ring groove disposed on said first bore portion for retaining a ring seal for hydraulically sealing said outboard piston within said bore of said outboard cylinder member; and a dust seal groove disposed on said second bore portion for retaining a dust seal for preventing passage of external contaminants into said bore of said outboard cylinder member.

4. A disc brake apparatus according to claim 1, further comprises:

an inboard fluid chamber defined by said bore of said inboard cylinder member and said second end of said inboard piston;

an outboard fluid chamber defined by said bore of said outboard cylinder member and said second end of said outboard piston; and a fluid passage hydraulically interconnecting said inboard fluid chamber to said outboard fluid chamber through a fluid channel in said bridge member.

5. A disc brake apparatus according to claim 3, wherein said ring seal further comprises a polygonal cross-section for forcing said outboard piston into said resting position upon release of said hydraulic signal.

6. A disc brake apparatus according to claim 1, wherein said second end of said inboard piston has a smaller diameter than that of said second end of said outboard piston.

7. A disc brake according to claim 1, wherein said outer cylinder member further comprises:

a bore member having disposed therein said first and second bore portions and said second shoulder and a plurality of fastener apertures;

a cover having therein a plurality of fastener apertures disposed therein and oriented to axially align with said plurality of fastener apertures disposed in said bore member;

a plurality of threaded fasteners extending through said plurality of apertures in said cover and engaging threaded portions of said plurality of apertures in said bore member; and a cover seal disposed between said cover and said bore member for sealing the hydrualic signal within said first bore portion.

8. A disc brake apparatus for use in a hydraulic brake system having a master cylinder for generating a hydraulic signal in a hydraulic line, said disc brake apparatus comprising:

a brake disc having inner and outer braking surfaces;

a carrier fixedly secured to a non-rotatable portion of a body of the vehicle; an inner pad facing said inner braking surface and an outer pad facing said outer braking surface, said inner and outer pads being supported for sliding movement in an axial direction of said brake disc so as to be engageable with said inner and outer braking surfaces of said brake disc; and a caliper slidably supported on said carrier, said caliper comprising:

an inboard cylinder member including a bore;

an inboard piston slidable housed within said bore of said inboard cylinder member, said piston having a first end adapted to force said inner pad onto said inner braking surface of said brake disc in response to the hydraulic signal applied to a second end of said inboard piston;

an inboard seal disposed between said inboard piston and said bore of said inboard cylinder member;

an out board cylinder member having first and second bore portions axially aligned and having a first shoulder therebetween, said second bore portion being adjacent to said outer pad and having a smaller diameter than said first bore portion;

a bridge member spanning said brake disc and said inner and outer pads and interconnecting said inboard and outboard cylinder members;

an outboard piston having first and second piston portions axially aligned, said first piston portion disposed within said second bore portion and having a first end adapted to force said outer pad toward said inner braking surface of said brake disc in response to the hydraulic signal applied to a second end of said outboard piston disposed on said second piston portion, said second piston portion being in a sealed relationship with said first bore portion;

a second shoulder disposed between said first and second piston portions and extending radially outward from an outer surface of said outboard piston for engagement with said first shoulder of said outboard cylinder member to retain said outboard piston in an applied position;

an outboard seal disposed within said bore of said outboard cylinder member, said seal being sufficiently compressed by said outboard piston in said applied position so as to return said outboard piston to a resting position upon release of said hydraulic signal;

an outboard seal groove disposed on said first shoulder for retaining said outboard seal for engagement with said second shoulder;

a ring groove disposed on said first bore portion for retaining a ring seal for hydraulically sealing said outboard piston within said bore of said outboard cylinder member; and a dust seal groove disposed on said second bore portion for retaining a dust seal for preventing passage of external contaminants into said bore of said outboard cylinder member.

9. A disc brake apparatus according to claim 8, wherein said inboard seal comprises a rollback seal disposed within a groove cut in said bore of said inner cylinder member, said rollback seal having a polygonal cross-section.

10. A disc brake apparatus according to claim 8, further comprises:

an inboard fluid chamber defined by said bore of said inboard cylinder member and said second end of said inboard piston;

an outboard fluid chamber defined by said bore of said outboard cylinder member and said second end of said outboard piston;

a fluid passage hydraulically interconnecting said inboard fluid chamber to said outboard fluid chamber through a fluid channel in said bridge member.

11. A disc brake apparatus according to claim 8, wherein said ring seal further comprises a polygonal cross-section for forcing said outboard piston into said resting position upon release of said hydraulic signal.

12. A disc brake apparatus according to claim 8, wherein said second end of said inboard piston has a smaller diameter than that of said second end of said outboard piston.

13. A disc brake according to claim 8, wherein said outer cylinder member further comprises:

a bore member having disposed therein said first and second bore portions and said second shoulder and a plurality of fastener apertures;

a cover having therein a plurality of fastener apertures disposed therein and oriented to axially align with said plurality of fastener apertures disposed in said bore member;

a plurality of threaded fasteners extending through said plurality of apertures in said cover and engaging threaded portions of said plurality of apertures in said bore member; and a cover seal disposed between said cover and said bore member for sealing the hydrualic signal within said first bore portion.

14. A disc brake apparatus for use in a hydraulic brake system having a master cylinder for generating a hydraulic signal which is communicated through a hydraulic line and proportional to an actuation force applied to inner and outer pads for resisting rotation of a brake rotor of the type found on motor vehicles, said disc brake apparatus comprising:

an inboard cylinder member including a bore;

an inboard piston slidably housed within said bore of said inboard cylinder member, said piston having a first end adapted to force the inner pad onto the brake rotor in response to the hydraulic signal applied to a second end of said inboard piston;

an inboard seal disposed between said inboard piston and said bore of said inboard cylinder member;

an outboard cylinder member having first and second bore portions axially aligned and having a first shoulder therebetween, said second bore portion being adjacent to the outer pad and having a smaller diameter than said first bore portion;

a bridge member spanning the brake rotor and the inner and outer pads and interconnecting said inboard and outboard cylinder members;

an outboard piston having first and second piston portions axially aligned, said first piston portion being in a sealed relationship with said second bore portion and having a first end adapted to force the outer pad toward the inner braking surface of the brake disc in response to the hydraulic signal applied to a second end of said outboard piston disposed on said second piston portion, said second piston portion being in a sealed relationship with said first bore portion and having a diameter greater than a diameter of said second end of said inboard piston;

a second shoulder extending radially outward from an outer surface of said outboard piston for engagement with said first shoulder of said outboard cylinder member to retain said outboard piston in an applied position; and an outboard seal disposed within said bore of said outboard cylinder member, said seal being sufficiently compressed by said outboard piston in said applied position so as to return said outboard piston to a resting position upon release of said hydraulic signal;

wherein said outboard cylinder member further comprises:
- a bore member having disposed therein said first and second bore portions and said second shoulder and a plurality of fastener apertures;
- a cover having therein a plurality of fastener apertures disposed therein and oriented to axially align with said plurality of fastener apertures disposed in said bore member;
- a plurality of threaded fasteners extending through said plurality of apertures in said cover and engaging threaded portions of said plurality of apertures in said bore member; and
- a cover seal disposed between said cover and said bore member for sealing the hydraulic signal within said first bore portion.

15. A disc brake apparatus according to claim 14, further comprising:

an outboard seal groove disposed on said first shoulder for retaining said outboard seal for engagement with said second shoulder;

a ring groove disposed on said first bore portion for retaining a ring seal for hydraulically sealing said outboard piston within said bore of said outboard cylinder member, said ring seal includes a polygonal cross-section for forcing said outboard piston into said resting position upon release of said hydraulic signal; and a dust seal groove disposed on said second bore portion for retaining a dust seal for preventing passage of external contaminants into said bore of said outboard cylinder member.

16. A disc brake apparatus according to claim 14, further comprising:

an inboard fluid chamber defined by said bore of said inboard cylinder member and said second end of said inboard piston;

an outboard fluid chamber defined by said bore of said outboard cylinder member and said second end of said outboard piston; and a fluid passage hydraulically interconnecting said inboard fluid chamber to said outboard fluid chamber through a fluid channel in said bridge member.

* * * * *